United States Patent Office 3,592,780
Patented July 13, 1971

3,592,780
PRETREATMENT OF PLATINUM REFORMING CATALYST
Jay A. Rashkin, Piscataway, N.J., assignor to Cities Service Oil Company, Tulsa, Okla.
No Drawing. Filed Dec. 29, 1969, Ser. No. 888,950
Int. Cl. B01j *11/74*
U.S. Cl. 252—439                6 Claims

ABSTRACT OF THE DISCLOSURE

Fresh platinum reforming catalyst is pretreated by initially contacting the catalyst with hydrogen and reforming naphtha containing at least about 200 parts per million sulfur at a temperature between about 700 and about 750° F., a pressure between about 200 and about 600 p.s.i.g. and a space velocity between about 1 and about 3 w./w./hr. The temperature is then raised to between about 800 and about 850° F. over a period between about 2 and about 7 hours after which the flow naphtha is discontinued and the catalyst is contacted with inert gas (preferably nitrogen) at a temperature between about 800 and about 850° F., and a pressure between about 25 and about 150 p.s.i.g. for a time between about 8 and about 24 hours. The catalyst is then again contacted with sulfur-containing reforming naphtha under the same pressure and space velocity conditions as before and the temperature is gradually raised to the range of between about 890 and about 940° F. over a period of between 2 and about 7 hours, at the end of which time the catalyst is again subjected to contact with inert gas for an additional period of between about 8 and about 24 hours. Following the final inert gas soak, the catalyst is ready for use in reforming naphtha of low sulfur content in a conventional manner.

---

The present invention relates to catalytic reforming of liquid hydrocarbon fractions and more particularly to a method for pretreating platinum catalyst for use in such processes.

The term "catalytic reforming" as used herein refers to processes of the type wherein a hydrocarbon fraction is subjected to treatment at high temperature and superatmospheric pressure in the presence of hydrogen gas and a suitable catalyst to provide a highly aromatized or otherwise chemically reconstructed product. The hydrocarbon feed stock to the reforming process is preferably one boiling in the gasoline range, e.g., naphtha, whereby the product has a higher octane number. Thus, the term catalytic reforming denotes something more than mere purification of a hydrocarbon fraction such as by desulfurization. Accordingly, among the hydrocarbon conversion reactions which may occur to a greater or lesser extent during the reforming process are dehydrogenation of naphthenes to aromatics, hydrocracking of higher boiling paraffins, isomerization of paraffins to products having a greater degree of chain branching, dehydrocyclization of paraffins and desulfurization.

It is known to employ catalyst compositions containing platinum on a suitable support material such as alumina in the reforming of gasoline boiling range hydrocarbon fractions and it is also known that such catalysts may include yield stability promoters such as rhenium to maintain high yields of high octane product throughout relatively long life of the platinum catalyst. Such catalyst, especially platinum rhenium catalyst, permits operation at high levels of activity and selectivity for relatively long periods of operation. However, such catalyst also possesses an initial high activity for hydrocracking of the naphtha feed. This high demethanation activity results in the production of copious amounts of light hydrocarbons, primarily methane, which are generally undesirable as products of the process. During the initial reforming period when demethanation activity of the catalyst is high, selectivity for the production of high octane gasoline is correspondingly low. In fact, the demethanation activity of some platinum reforming catalysts, especially those containing rhenium as a promoter, is so high during the initial periods of reforming that the catalysts are considered unacceptable for reforming for a period of several hundred hours of operation.

It has now been found that the initial high demethanation activity of platinum hydroforming catalyst, especially where yield stability promoters such as rhenium are used, can be substantially eliminated by an appropriate pretreatment of the catalyst. The present invention, therefore, contemplates a pretreatment process in which fresh platinum reforming catalyst is initially contacted with hydrogen and reforming naphtha containing substantial amounts of sulfur, usually at least about 200 parts per million (p.p.m.) and more usually between about 200 and about 500 p.p.m., at a temperature between about 700 and about 750° F. Hydrogen partial pressure during this initial contacting is preferably maintained between about 200 and about 600 p.s.i.g. and space velocity between about 1 and about 3 weight of feed per weight of catalyst per hour (w./w./hr.). The initial temperature is then raised over a period of between about 2 and about 7 hours to a temperature in the range between about 800 and about 850° F. at which the flow of naphtha is discontinued and the catalyst is contacted with inert gas such as nitrogen. The inert gas is left in contact with the catalyst at a temperature in the 800 to 850° F. range and under a pressure of between about 25 and about 150 p.s.i.g. for a time of between about 8 and about 24 hours. Following this inert gas soak, the catalyst is again contacted with hydrogen and high sulfur content naphtha under the same pressure and space velocity conditions as before and the temperature is gradually increased to a temperature in the range of between about 890 and about 940° F. over a period of between about 2 and about 7 hours. At the end of this period of time, the flow of hydrogen and naphtha is again discontinued and the catalyst subjected to a second inert gas soak at a temperature between about 890 and about 940° F. and a pressure between about 25 and about 150 p.s.i.g. for a time of between about 8 and about 24 hours. Following this second inert gas soak, the catalyst is ready for use and may then be contacted with conventional naphtha reformer feed generally containing less than about 1 p.p.m. sulfur for conventional reforming operations.

Catalyst suitable for use in practicing the invention comprises a suitable porous solid support, preferably eta or gamma alumina, on which is deposited catalytically active amounts of platinum, preferably between about 0.01 and 3 weight percent (wt. percent) platinum based on total catalyst including base. A suitable yield stability promoter such as rhenium is also preferably incorporated in the catalyst and when used is preferably present in amounts between about 0.01 and 3 wt. percent. It is generally preferred that the ratio of promoter to platinum not exceed 1. Larger amounts of platinum or promoter may be used but are generally not considered desirable because of the cost of the catalytic materials and the relatively insignificant further advantages to be obtained by use of larger concentrations of these materials.

The catalyst compositions used in practicing the present invention may be formed by a variety of conventional methods. One suitable method for example involves impregnating a particulate absorbent eta or gamma alumina gel with a solution of appropriate salts or acids of the desired metals. For example, a platinum catalyst may be prepared using chloroplatinic acid and subsequently drying and calcining the resulting catalyst. Where rhenium is used as a promoter, the rhenium may be incorporated by the use of perrhenic acid or ammonium perrhenate. The platinum and rhenium compounds can be impregnated simultaneously or sequentially. Other suitable methods of catalyst preparation such as those employing ion exchange techniques may also be used. The completed catalyst is, in accordance with conventional techniques, dried at a suitable temperature, for instance, in the range between about 200 and about 500° F. and then calcined at higher tempertures of for instance 800 to 1200° F. or even higher for periods between about 1 and about 4 hours.

If desired, catalyst used in practicing the invention may also be promoted by the addition of halides, especially fluorides or chlorides. If used, halides are preferably present in amounts between about 0.01 and 3 wt. percent based on total catalyst including base.

As mentioned above, the naphta used in pretreatment of catalyst in accordance with the invention preferably contains substantially large amounts of sulfur, preferably above 150 p.p.m., whereas the naphtha used in reforming operations following pretreatment contains relatively small amounts of sulfur, usually less than about 10 p.p.m. and preferably less than about 1 p.p.m. Such naphthas may be obtained from any suitable source and can for example be straight run naphtha or catalytically cracked naphtha or blends thereof. If necessary, sulfur may be added to the naphtha to provide the desired high sulfur levels for pretreatment. Likewise, sulfur may be removed from the feed stock where desirable by such conventional techniques as hydrodesulfurization.

Catalyst pretreated as described herein may be used in any conventional reforming operations, preferably using naphtha feed of the type described above. Typical reforming operations are conducted under conditions including hydrogen partial pressure of 125 to 750 p.s.i.g., total pressures of 150 to 800 p.s.i.g., temperatures of 880 to 1000° F., and space velocities of 1 to 3 w./w./hr.

Hydrogen used during the pretreatment operations and during normal reforming operations is usually present in the reactor in amounts between about 2 and about 7 mols hydrogen per mol of hydrocarbons.

EXAMPLE

To illustrate the advantages of platinum catalyst pretreated in accordance with the present invention, a platinum catalyst containing rhenium as a yield stability promoter was prepared by separately dissolving 2.134 grams of chloroplatinic acid and 1.157 grams of ammonium perrhenate in de-ionized water. The separate platinum and rhenium solutions were then mixed together and the combined solution used to impregnate 200 grams of a commercial gamma alumina support in the form of 1/16 inch extrudates. The wet impregnate was dried at 110° C. for 16 hours and then calcined in air at 90° F. for 2 hours.

The finished catalyst contained 0.35 wt. percent platinum and 0.35 wt. percent rhenium.

The thus prepared platinum rhenium catalyst was pretreated in accordance with the invention using a reforming naphtha boiling in the range between 203 and 356° F. The naphtha contained 400 p.p.m. sulfur and was composed of 45 volume percent paraffins, 36 volume percent naphthenes, 1 volume percent olefins and 18 volume percent aromatics. This pretreatment feed was passed over the catalyst with hydrogen gas under process conditions including a pressure of 400 p.s.i.g., a space velocity of 2.0 w./w./hr., a hydrogen to hydrocarbon ratio of about 5 to 1 and an initial temperature of 730° F. Once the pretreatment was started, the temperature was gradually increased at a steady rate over a four and one-half hour period until a final temperature of 820° F. was reached. The catalyst was then stripped with nitrogen and maintained under 50 p.s.i.g. pressure in a nitrogen atmosphere for a period of 16 hours at a temperature of 820° F. During the first ninety minutes of the naphtha pretreatment, exothermic conditions were observed in the reactor. After the 16 hour nitrogen soak, the pretreatment naphtha and hydrogen were again flowed through the catalyst under the same process conditions as above except that the temperature was again gradually increased at a steady rate from 820° F. to a final temperature of 910° F. over a 4 to 5 hour period. The pretreatment was continued at 910° F. for an additional 2 hours and the catalyst was then stripped with nitrogen and subjected to an additional nitrogen soak for 16 hours at 900° F. and 50 p.s.i.g.

The platinum rhenium catalyst manufactured and pretreated as described above was then used for evaluation of catalytic reforming performance in treating a typical mid-continent hydrodesulfurized reforming naphtha. This naphtha boiled within the range 202 to 384° F. contained less than 1 p.p.m. sulfur, less than 25 p.p.m. nitrogen and was composed of 46 volume percent paraffins, 44 volume percent naphthenes, 1.5 volume percent olefins and 8.2 volume percent aromatics. Operating conditions for this run included a pressure of 400 p.s.i.g. and a hydrogen to hydrocarbon ratio of 5.3 to 1. Additional information concerning this test run and products resulting therefrom will be found in Table I below in which the catalyst prepared and pretreated as described above is designated catalyst A.

In addition to the test run utilizing catalyst A which was pretreated in accordance with the invention, additional runs were performed as described above on various commercially available platinum catalysts designated B, C, D, E, F and G. These additional catalysts are representative of the various commercially available platinum reforming catalysts. All of these catalysts contained about 0.35 wt. percent platinum and catalyst G in addition contained rhenium. Data concerning runs performed with catalysts B, C, D, E, F and G is likewise reported in Table I below.

TABLE I

| Catalyst | A | | | B | | | C | | D | E | | F | G | | | |
|---|---|---|---|---|---|---|---|---|---|---|---|---|---|---|---|---|
| Run No. | 795 | 796 | 797 | 556 | 557 | 558 | 564 | 562 | 10,040 | 10,039 | 10,042 | 10,041 | 780 | 781 | 782 | 784 | 785 | 786 |
| Temp., °F. | 918 | 928 | 938 | 905 | 917 | 922 | 915 | 926 | 870 | 890 | 880 | 890 | 900 | 910 | 920 | 900 | 910 | 920 |
| Space velocity, w./hr./w. | 2.02 | 2.02 | 2.02 | 2.09 | 2.04 | 2.06 | 2.01 | 2.03 | 2.00 | 2.01 | 1.97 | 1.97 | 1.94 | 2.00 | 1.99 | 2.01 | 1.99 | 2.01 |
| $C_5$+selectivity [1] | | | | 2.7 | 3.0 | 4.3 | 2.7 | 3.5 | 1.2 | 4.7 | 1.3 | | 1.7 | 1.7 | 3.0 | 1.4 | 2.6 | 3.6 |
| $C_5$+F-1 clear octane | 87.9 | 89.9 | 93.5 | 90.2 | 92.9 | 95.4 | 91.8 | 95.1 | 89.3 | 94.5 | 90.9 | 94.2 | 90.7 | 91.2 | 93.4 | 91.5 | 93.5 | 95.1 |
| Yield: | | | | | | | | | | | | | | | | | | |
| Hydrogen (wt. percent) | 2.18 | 2.21 | 2.37 | 2.27 | 2.07 | 2.78 | 2.19 | 2.73 | 2.00 | 1.94 | 1.90 | 1.86 | 1.55 | 2.13 | 2.34 | 2.20 | 2.14 | 2.11 |
| $C_1$ (wt. percent) | 0.84 | 1.00 | 1.06 | 1.42 | 1.55 | 1.69 | 1.67 | 1.94 | 1.04 | 1.76 | 1.20 | 1.33 | 1.77 | 1.31 | 1.24 | 0.88 | 1.33 | 1.51 |
| $C_2$ (wt. percent) | 1.25 | 1.48 | 1.56 | 1.58 | 1.88 | 2.35 | 1.84 | 2.08 | 1.25 | 2.15 | 1.57 | 1.91 | 2.80 | 2.16 | 2.04 | 1.39 | 2.09 | 2.45 |
| $C_3$ (vol. percent) | 2.71 | 3.14 | 3.07 | 4.65 | 5.51 | 6.46 | 4.44 | 5.27 | 4.08 | 6.64 | 4.29 | 5.37 | 6.49 | 4.22 | 5.22 | 4.26 | 5.16 | 6.16 |
| $iC_4$ (vol. percent) | 1.25 | 1.55 | 1.69 | 2.10 | 2.66 | 2.97 | 1.85 | 2.29 | 1.92 | 3.34 | 2.19 | 2.78 | 2.91 | 1.88 | 2.90 | 2.20 | 2.90 | 2.87 |
| $nC_4$ (vol. percent) | 2.08 | 2.29 | 2.89 | 3.43 | 3.79 | 4.39 | 3.21 | 3.77 | 2.70 | 4.64 | 2.76 | 3.32 | 3.90 | 2.70 | 3.93 | 3.30 | 3.37 | 4.24 |
| $C_5$+ (vol. percent) | 87.4 | 86.1 | 81.9 | 83.6 | 81.9 | 79.1 | 82.8 | 80.2 | 85.3 | 79.2 | 84.4 | 82.1 | 81.1 | 83.9 | 81.5 | 84.3 | 81.9 | 79.8 |
| Total wt. balance (unadjusted) | 98.2 | 97.5 | 98.2 | 100.3 | 99.4 | 99.9 | 99.3 | 99.1 | 98.3 | 98.1 | 97.9 | 96.9 | 96.7 | 101.4 | 102.2 | 98.4 | 95.8 | 98.3 |

[1] $C_5$+selectivity=[$C_5$+yield (catalyst A)−$C_5$+vol. percent yield (other catalyst)] same $C_5$+ octane No.

From the data presented in Table I above, it can be seen that catalyst A which was pretreated in accordance with the invention has substantially improved selectivity for production of desirable $C_5+$ product at constant octane level. $C_5+$ selectivities as reported in Table I were determined at constant octane levels by the equation: $C_5+$ selectivity = $C_5+$ volume percent yield from catalyst A minus $C_5+$ volume percent yield from other catalyst. Positive values for $C_5+$ selectivity indicate how much more $C_5+$ product is produced by catalyst A than the other catalyst at the same octane. The superiority of the pretreatment of the present invention is clearly apparent by comparing the results obtained using catalyst A which was pretreated in accordance with the invention to those obtained using catalysts B, C, D, E, F and G which were not so pretreated.

While the invention has been described above with respect to preferred embodiments thereof, it will be understood by those skilled in the art that various changes and modifications are possible without departing from the spirit and scope of the invention.

I claim:

1. A method of pretreating fresh platinum reforming catalyst which comprises:
   initially contacting fresh platinum reforming catalyst with hydrogen and reforming naphtha containing at least about 200 p.p.m. sulfur at a temperature between about 700 and about 750° F., a pressure between about 200 and about 600 p.s.i.g., a space velocity between about 1 and about 3 w./w./hr. and a hydrogen to hydrocarbon ratio between about 2 and about 7.
   then raising the temperature of the reforming zone over a period between about 2 and about 7 hours to a temperature level between about 800 and about 850° F.;
   then discontinuing flow of hydrogen and naphtha and contacting the catalyst with inert gas at a temperature between about 800 and about 850° F. and a pressure between about 25 and about 150 p.s.i.g. for a period of time between about 8 and about 24 hours;
   then again contacting the catalyst with hydrogen and reforming naphtha containing at least about 200 p.p.m. sulfur at a pressure between about 200 and about 600, a space velocity between about 1 and about 3 and a hydrogen to hydrocarbon ratio between about 2 and about 7 while increasing the temperature of the reforming zone over a period of between about 2 and about 7 hours to a final temperature between about 890 and about 940° F.; and
   then again discontinuing flow of hydrogen and naphtha through the reforming zone and contacting the catalyst with inert gas at a temperature between about 890 and about 940° F. and a pressure between about 25 and about 150 p.s.i.g. for a time of between about 8 and about 24 hours.

2. The process of claim 1 in which the pretreated catalyst is subsequently contacted in a reforming zone under reforming conditions with hydrogen and reforming naphtha containing less than about 1 p.p.m. sulfur.

3. The process of claim 1 in which the catalyst contains between about 0.01 and about 3.0 wt. percent platinum on an alumina base.

4. The process of claim 3 in which the catalyst also contains between about 0.01 and about 3.0 wt. percent of a stability promoter.

5. The process of claim 4 in which the promoter is rhenium.

6. The process of claim 1 in which the inert gas is nitrogen.

References Cited

UNITED STATES PATENTS

| | | | |
|---|---|---|---|
| 3,006,841 | 10/1961 | Haensel | 208—139 |
| 3,067,130 | 12/1962 | Baldwin | 208—140 |
| 3,330,761 | 7/1967 | Capsuto | 208—139 |

DANIEL E. WYMAN, Primary Examiner

P. M. FRENCH, Assistant Examiner

U.S. Cl. X.R.

208—138, 139, 140